United States Patent
Lüneburg et al.

(10) Patent No.: US 10,935,072 B2
(45) Date of Patent: Mar. 2, 2021

(54) HYBRID HYDROSTATIC BEARING ASSEMBLY AND WIND TURBINE

(71) Applicants: THYSSENKRUPP ROTHE ERDE GMBH, Dortmund (DE); thyssenkrupp AG, Essen (DE)

(72) Inventors: Bernd Lüneburg, Mülheim (DE); Jörg Rollmann, Lippstadt (DE); Gunther Elfert, Erwitte (DE)

(73) Assignees: THYSSENKRUPP ROTHE ERDE GMBH, Dortmund (DE); THYSSENKRUPP AG, Essen (DE)

( * ) Notice: Subject to any disclaimer, the term of this patent is extended or adjusted under 35 U.S.C. 154(b) by 0 days.

(21) Appl. No.: 16/494,367

(22) PCT Filed: Mar. 14, 2018

(86) PCT No.: PCT/EP2018/056339
§ 371 (c)(1),
(2) Date: Sep. 16, 2019

(87) PCT Pub. No.: WO2018/167122
PCT Pub. Date: Sep. 20, 2018

(65) Prior Publication Data
US 2020/0088234 A1    Mar. 19, 2020

(30) Foreign Application Priority Data
Mar. 15, 2017  (DE) ............... 10 2017 105 576.2

(51) Int. Cl.
*F16C 17/03*    (2006.01)
*F16C 17/06*    (2006.01)
(Continued)

(52) U.S. Cl.
CPC ............. *F16C 21/00* (2013.01); *F03D 80/70* (2016.05); *F16C 17/03* (2013.01); *F16C 17/06* (2013.01);
(Continued)

(58) Field of Classification Search
CPC ............. F16C 17/03; F16C 17/06; F16C 19/385–386; F16C 21/00; F16C 32/0662;
(Continued)

(56) References Cited

U.S. PATENT DOCUMENTS 3,708,215 A    1/1973  Wilcock
3,866,987 A *  2/1975  Garner ................. F16C 33/26
                                                      384/95
(Continued)

FOREIGN PATENT DOCUMENTS

CN    104169575 A  * 11/2014  ............. F16C 19/28
CN    105358953 A  *  2/2016  ............. F16C 19/52
(Continued)

OTHER PUBLICATIONS

English Translation of International Search Report issued in PCT/EP2018/056339, dated Jun. 22, 2018.

*Primary Examiner* — Marcus Charles
(74) *Attorney, Agent, or Firm* — thyssenkrupp North America, LLC

(57) ABSTRACT

A bearing assembly may include a first bearing ring, a second bearing ring, and at least one row of rolling elements having a plurality of rolling elements that are disposed so as to be capable of rolling on a first raceway of the first bearing ring and on a second raceway of the second bearing ring. At least one hydrostatically supported first sliding bearing segment may be disposed on the first bearing ring. Further, the hydrostatically supported first sliding bearing segment may interact with a first bearing face that is disposed on the
(Continued)

second bearing ring. The hydrostatically supported first sliding bearing segment may be mounted so as to be movable in a movement direction that is perpendicular to the first bearing face.

16 Claims, 9 Drawing Sheets

(51) Int. Cl.
*F16C 19/38* (2006.01)
*F16C 33/78* (2006.01)
*F03D 80/70* (2016.01)
*F16C 21/00* (2006.01)
*F16C 32/06* (2006.01)

(52) U.S. Cl.
CPC ........ *F16C 19/386* (2013.01); *F16C 32/0662* (2013.01); *F16C 32/0696* (2013.01); *F16C 33/7813* (2013.01); *F05D 2240/53* (2013.01); *F16C 2360/31* (2013.01)

(58) Field of Classification Search
CPC .............. F16C 32/0696; F16C 33/7813; F16C 33/7889; F16C 2360/61; F16C 2300/14; F03D 3/06; F03D 3/10; F03D 80/70; G01M 13/045; F05B 2240/21; F05B 2240/24; F05B 2240/50; F05B 2240/53
USPC ................. 384/127–128, 454, 565, 571, 606
See application file for complete search history.

(56) References Cited

U.S. PATENT DOCUMENTS

| | | | |
|---|---|---|---|
| RE28,625 E * | 11/1975 | Cunningham | E21B 10/22 384/96 |
| 4,114,959 A | 9/1978 | Christ | |
| 2005/0093217 A1 * | 5/2005 | Brandenstein | F16C 39/02 267/274 |
| 2011/0162174 A1 * | 7/2011 | Liesegang | F16C 35/078 24/457 |
| 2011/0206310 A1 * | 8/2011 | Ventzke | F16C 33/605 384/565 |
| 2015/0219076 A1 * | 8/2015 | Wendeberg | F03D 80/88 416/174 |
| 2016/0025068 A1 * | 1/2016 | Frank | F03D 80/70 384/492 |
| 2016/0208850 A1 | 7/2016 | Durling | |
| 2016/0369841 A1 | 12/2016 | Ciulla | |
| 2018/0209477 A1 * | 7/2018 | Sauter | F16C 33/585 |

FOREIGN PATENT DOCUMENTS

| | | | | |
|---|---|---|---|---|
| CN | 105473881 A | * | 4/2016 | ............ F16C 33/805 |
| CN | 106257070 A | | 12/2016 | |
| DE | 10311851 A1 | * | 9/2004 | ............ F16C 19/522 |
| DE | 199 83 059 B | | 2/2009 | |
| DE | 102012004329 A1 | * | 8/2013 | .............. F16C 21/00 |
| DE | 202015006588 U1 | * | 12/2016 | ............ F16C 19/381 |
| EP | 1 209 287 A | | 5/2002 | |
| EP | 2 921 728 A | | 9/2015 | |
| GB | 2070156 A | | 9/1981 | |
| JP | 2013064463 A | * | 4/2013 | .............. F16C 21/00 |
| WO | WO-2013117980 A1 | * | 8/2013 | .............. F16C 21/00 |
| WO | 2018/67122 A | | 4/2018 | |

* cited by examiner

HYBRID HYDROSTATIC BEARING ASSEMBLY AND WIND TURBINE

CROSS REFERENCE TO RELATED APPLICATIONS

This application is a U.S. National Stage Entry of International Patent Application Serial Number PCT/EP2018/056339, filed Mar. 14, 2018, which claims priority to German Patent Application No. DE 10 2017 105 576.2, filed Mar. 15, 2017, the entire contents of both of which are incorporated herein by reference.

FIELD

The present disclosure generally relates to bearing assemblies.

BACKGROUND

A hybrid bearing assembly for mounting a rotor shaft of a wind turbine is known from EP 2 921 728 A1, the bearing assembly comprising a plurality of rows of rolling elements, the rolling elements thereof being able to roll on raceways of a first and of a second bearing ring. In the case of the known bearing assembly, two sliding bearing rings which are hydrodynamically supported on a bearing face of the respective opposite bearing rings are additionally provided. This means that a lubricating film between the respective sliding bearing ring and the bearing face is generated only upon the mutual movement of the bearing rings. In the event of low rotating speeds, the sliding bearing rings are in each case situated in a retracted resting position in which substantially no forces are received by way of the sliding bearing rings. In the event of a comparatively high rotating speed, the sliding bearing rings are moved by an actuator toward the opposite bearing face such that the sliding bearing ring and the bearing face act as a hydrodynamic sliding bearing.

In the case of the known hybrid bearing assembly having a plurality of roller bearings and a plurality of hydrodynamic sliding bearings it has proven disadvantageous that no forces are transmitted by way of the hydrodynamic sliding bearings in the event of a stoppage and comparatively low speeds. In this operating state, all of the forces have to be received by the roller bearings, this reducing the service life of the latter. Moreover, the load bearing capability when stopped and at low rotating speeds is reduced by the non-effective sliding bearing. When the hydrodynamic sliding bearing is activated, a relatively high rotating speed has to be achieved in order for a complete separation of the bearing rings from the opposite bearing face to be obtained. However, the bearing assembly at low rotating speeds is susceptible to evidence of wear.

A further hybrid bearing assembly is known from U.S. Pat. No. 3,708,215 A. Apart from a roller bearing, this bearing assembly additionally comprises a hydrostatic bearing having an active lubricant circuit. In the case of this bearing assembly, the sliding bearing can indeed receive forces even when stopped and at low rotating speeds; however, dissimilar lubricating gap widths which increase the throughput of the lubricant can result by virtue of dissimilar stresses in the circumferential direction. A further disadvantage of this hybrid bearing assembly lies in that the roller bearing and the sliding bearing have mutually separate bearing rings, on account of which the rigidity of the bearing assembly is reduced in such a manner that the requirements in terms of the mounting of rotor shafts of wind turbines cannot be met.

Thus a need exists for a bearing assembly which enables a rigid mounting having a long service life and low wear and additionally provides damping even at high stresses across the entire rotating speed range.

DETAILED DESCRIPTION

Figure 1:
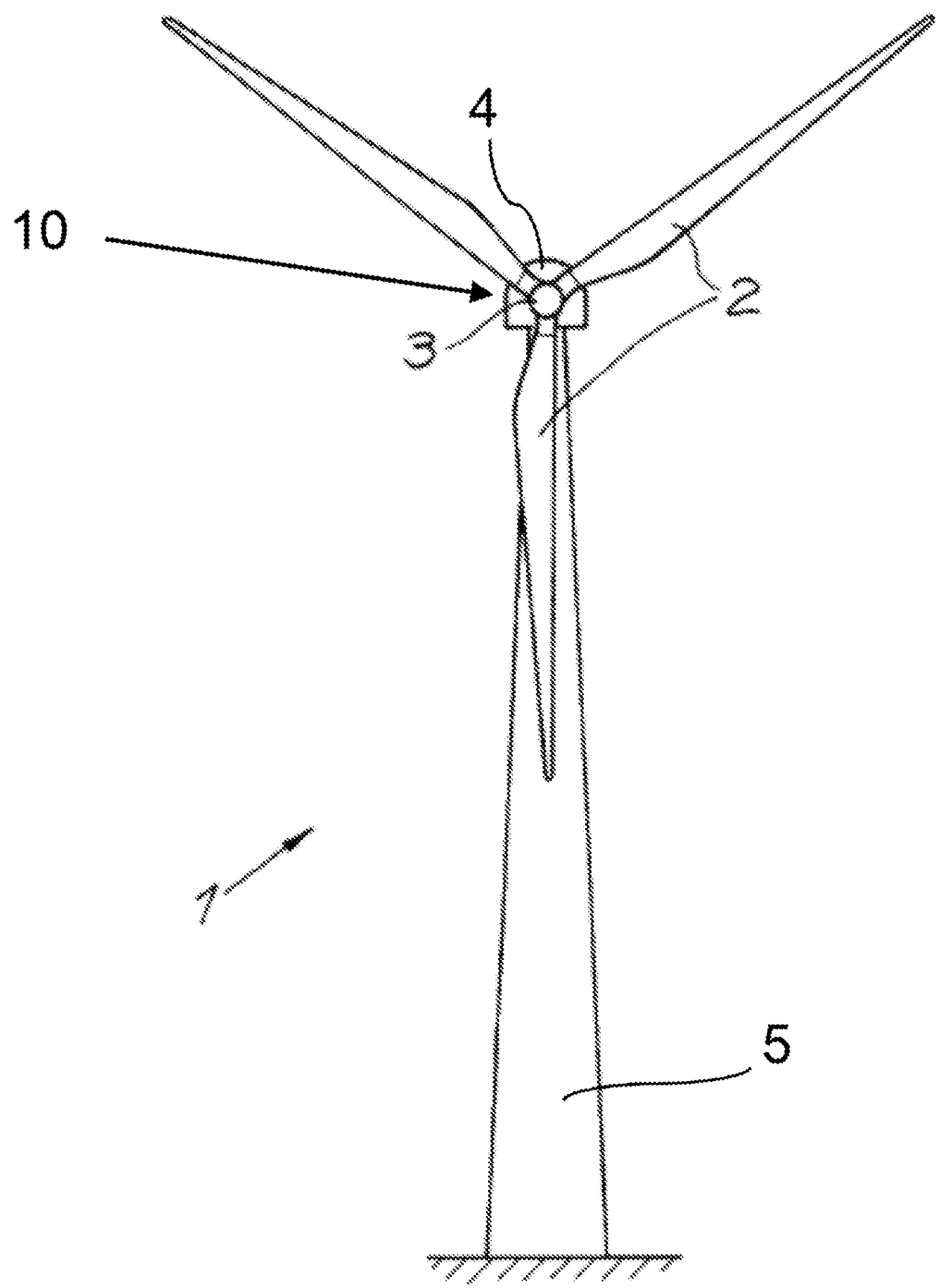
FIG. 1 is a front view of an example wind turbine.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure generally relates to bearing assemblies. In some examples, a bearing assembly may include a first bearing ring, a second bearing ring, and at least one row of rolling elements having a plurality of rolling elements that are disposed so as to be capable of rolling on a first raceway of the first bearing ring and on a second raceway of the second bearing ring. In some instances, the bearing assembly may be used for mounting a rotor shaft of a wind turbine, for example.

In some examples, a bearing assembly may include, as set forth above, a first bearing ring, a second bearing ring, and at least one row of rolling elements having a plurality of rolling elements which are disposed so as to be capable of rolling on a first raceway of the first bearing ring and on a second raceway of the second bearing ring is proposed. In some cases, at least one hydrostatically supported first sliding bearing segment which interacts with a first bearing face that is disposed on the second bearing ring is disposed on the first bearing ring.

The bearing assembly according to the invention represents a hybrid bearing assembly having at least one roller bearing and at least one hydrostatic sliding bearing. In the case of the bearing assembly according to the invention, the first raceway for the rolling elements of the first row of rolling elements as well as the at least one sliding bearing segment are disposed on the first bearing ring. The second raceway for the rolling elements as well as the bearing face for interacting with the sliding bearing segment are provided on the second bearing ring. To this extent, a rigid bearing in which forces are capable of being transmitted between the first and the second bearing ring by way of the rolling elements, or the hydrostatic bearing mounting, respectively, is formed. The hydrostatic sliding bearing segment can transmit forces between the bearing rings even in the event of a stoppage or at low mutual rotating speeds of the bearing rings in relation to one another so that the wear on the roller bearing is reduced and the service life of the bearing assembly is increased. Furthermore, damping can be provided by the hydrostatically supported sliding bearing segment both when stopped as well as in the case of a rotating bearing assembly.

The first bearing ring can be an inner ring and the second bearing ring can be an outer ring of the bearing assembly. Alternatively, the first bearing ring can be an outer ring and the second bearing ring can be an inner ring. Either the first bearing ring or the second bearing ring can be configured as a split bearing ring having a plurality of bearing ring parts in order for the assembling of the bearing assembly to be simplified. For example, the second bearing ring can be configured in one piece, and the first bearing ring can be split in an axial direction, thus in a direction parallel to the rotation axis. Alternatively, the first bearing ring can be configured in one piece, and the second bearing ring can be split in the axial direction.

According to one preferred design embodiment of the invention, a plurality of hydrostatically supported first sliding bearing segments which are mutually spaced apart in a circumferential direction of the first bearing ring and interact with a first bearing face that is disposed on the second bearing ring are disposed on the first bearing ring. The lubricant gap on the sliding bearing segments that separates the bearing rings can adjust itself individually on account of the plurality of sliding bearing segments that are disposed so as to be mutually spaced apart along the circumferential direction of the first bearing ring. It is therefore possible for a variable width of the lubricating gap in the circumferential direction that is created by asymmetrical stress to be counteracted such that a lubricant gap which is ideally uniform across the circumferential direction and has a reduced lubricant throughput is obtained. The first sliding bearing segments particularly preferably form a first row of sliding bearing segments that runs in the circumferential direction, wherein the first sliding bearing segments interact with the same bearing face. All of the first sliding bearing segments are preferably of identical configuration. Alternatively, the first sliding bearing segments can be of dissimilar configuration. For example, the first sliding bearing segments can have dissimilar cross sections and/or surfaces of dissimilar sizes that are effective in relation to the bearing face.

The first sliding bearing segment preferably does not extend across the entire circumference of the first bearing ring. This means that the first sliding bearing segment in the circumferential direction of the first bearing ring preferably does not extend across the entire bearing ring.

According to one preferred design embodiment of the invention, the first sliding bearing segment or the first sliding bearing segments is/are mounted so as to be movable in a movement direction that is disposed so as to be perpendicular to the first bearing face such that the lubricant gap between the first sliding bearing segment and the bearing face can be adjusted, in particular in a self-acting manner, by a movement along the movement direction.

One advantageous design embodiment provides that the first sliding bearing segment or the first sliding bearing segments is/are mounted so as to be movable in a movement direction and tiltable about a tilting axis which is disposed so as to be perpendicular to the movement direction. The movement direction can be the axial direction, the radial direction, or a direction that extends transversely to the axial direction and transversely to the radial direction. In the case of a design embodiment of this type, the first sliding bearing segment or the first sliding bearing segments is/are movable in a plurality of degrees of freedom such that an adjustment of the lubricant gap between the sliding bearing segment and the bearing face is possible simultaneously in a plurality of spatial directions. The first sliding bearing segment or the first sliding bearing segments is/are preferably mounted so as to be movable in a movement direction and tiltable about a plurality of tilting axes which are disposed so as to be perpendicular to the movement direction.

According to one advantageous design embodiment it is provided that the first sliding bearing segments are disposed so as to be distributed across the entire first bearing ring in a substantially uniform manner along the circumferential direction. To this extent, the first sliding bearing segments can form a row of sliding bearing segments which in the circumferential direction extends about the entire first bearing ring. The first sliding bearing segments preferably have in each case an identical mutual spacing.

According to one alternatively preferred design embodiment the sliding bearing segments are disposed so as to be distributed across the entire first bearing ring in a substantially non-uniform manner along the circumferential direction. In the case of a stationary disposal of the first bearing ring, a design embodiment of this type enables an adaptation to non-symmetrical effects of forces to be anticipated. Moreover, the input in terms of material and the complexity in terms of servicing as well as the lubricant throughput for the hydrostatic mounting can be further reduced. It is particularly preferable for the for bearing ring along the circumferential direction to have a first annular-segment-shaped region having a plurality of first sliding bearing segments, and a second annular-segment-shaped region in which no sliding bearing segments are disposed, in particular wherein the first and the second annular-segment-shaped region are of identical size. For example, a first annular-segment-shaped region having a plurality of first sliding bearing segments can be disposed at such locations along the circumferential direction that are exposed to an increased effect of force, for example an effect of weight, and a second annular-segment-shaped region in which no sliding bearing segments are disposed can be disposed at such locations along the circumferential direction that are not exposed to any increased effect of force. Forces can be received by way of the rolling elements at locations that are not exposed to any increased effect of force.

According to one advantageous design embodiment at least one hydrostatically supported second sliding bearing segment which interacts with a second bearing face that is disposed on the second bearing ring is disposed on the first bearing ring. The second bearing face is preferably spaced apart from the first bearing face in the axial direction.

One advantageous design embodiment provides that a plurality of hydrostatically supported second sliding bearing segments which are mutually spaced apart in a circumferential direction of the first bearing ring and interact with a second bearing face that is disposed on the second bearing ring are disposed on the first bearing ring. The second sliding bearing segments preferably form a second row of sliding bearing segments that runs in the circumferential direction, wherein the second row of sliding bearing segments is spaced apart in an axial direction that runs parallel to a rotation axis of the bearing assembly. The second sliding bearing segments preferably interact with the same bearing face. All of the second sliding bearing segments are particularly preferably of identical configuration. It is advantageous for the first sliding bearing segments and the second sliding bearing segments to be of identical configuration. A third row of sliding bearing segments having third sliding bearing segments, or further rows of sliding bearing segments having corresponding sliding bearing segments, can optionally be provided.

In this context, it is advantageous for the first sliding bearing segments and the second sliding bearing segments to be disposed so as to be asymmetrical in terms of a radial plane that is disposed so as to be perpendicular to a rotation axis of the bearing assembly. In the case of a stationary disposal of the first bearing ring, a design embodiment of this type enables an even further improved adaptation to non-symmetrical effects of forces to be anticipated. It is preferable for the first row of sliding bearing segments to comprise a first annular-segment-shaped region having a plurality of first sliding bearing segments, and a second annular-segment-shaped region in which no first sliding bearing segments are disposed, and for the second row of sliding bearing segments to comprise a third annular-segment-shaped region which comprises a plurality of second sliding bearing segments, and a fourth annular-segment-shaped region in which no second sliding bearing segments are disposed, wherein the first annular-segment-shaped region and the third annular-segment-shaped region are disposed so as not to be symmetrical in relation to the radial plane. Alternatively, it is possible that the second sliding bearing segments in relation to the first sliding bearing segments comprise an offset in the circumferential direction.

According to one advantageous design embodiment, the first bearing ring is configured as a stationary bearing ring, and the second bearing ring is rotatable in relation to the first bearing ring.

The first bearing face and/or the second bearing face is/are preferably designed so as to be cylindrical.

The first sliding bearing segment and/or the second sliding bearing segment preferably comprise/comprises a circular cross section. To this extent, the first pressure surface and/or the second pressure surface of the corresponding sliding bearing segment can be circular. Alternatively, the first sliding bearing segment and/or the second sliding bearing segment can comprise an elliptic or angular, for example a triangular, quadrangular, or polygonal, cross section.

According to one advantageous design embodiment, the first sliding bearing segment and/or the second sliding bearing segment are/is formed from bronze. Alternatively, the first and/or the second sliding bearing segment can have a coating from white metal.

The rolling elements are preferably configured as tapered rollers. Alternatively, the rolling elements can be configured as balls, cylindrical rollers, barrel rollers, or toroidal rollers. The bearing assembly can optionally have a plurality of rows of rolling elements, each having a plurality of rolling elements, which are disposed so as to be capable of rolling on further raceways of the first bearing ring and on further raceways of the second bearing ring. The rows of rolling elements are preferably disposed in such a manner that the bearing assembly forms an axial/radial bearing which can receive forces in the axial direction as well as in the radial direction. The rotation axes of the rolling elements of the rows of rolling elements are preferably disposed so as to be inclined in relation to the axial direction as well as in relation to the radial direction such that the rolling elements can receive forces in the radial direction and the axial direction. Alternatively, the rotation axes of the rolling elements of a first row of rolling elements can be aligned in the axial direction, and the rotation axes of the rolling elements of a second row of rolling elements can be aligned in the radial direction.

The rolling element raceways are preferably hardened, preferably inductively hardened. The bearing faces for the hydrostatic elements can be hardened or non-hardened.

According to one advantageous design embodiment of the invention at least one first sliding bearing element, preferably all first sliding bearing elements, is/are received in a receptacle pocket of the first bearing ring in such a manner that a first compression chamber is formed between the first bearing ring and the first sliding bearing segment, and the first sliding bearing segment is configured in such a manner that a second compression chamber is formed between the first sliding bearing segment and the second bearing ring, wherein the first compression chamber and the second compression chamber are connected by way of a duct that runs through the first sliding bearing segment. A pressure in the first compression chamber which pushes the first sliding bearing segment in the direction of the first bearing face of the second bearing ring and acts as a spring/damper system can be generated by directing a lubricant into the first compression chamber. A second compression chamber in which a lubricant film having a lubricant gap width can be configured is formed between the first sliding bearing segment and the second bearing ring, in particular the bearing face of the second bearing ring. The first and the second compression chamber are connected by a duct that runs through the first sliding bearing segment such that the second compression chamber can be supplied with lubricant by way of the duct. A pressure equalization between the first compression chamber and the second compression chamber can take place by way of the duct. It is not necessary for separate springs to be provided for elastically mounting the first sliding bearing segments. Less complexity in terms of assembling and servicing results.

According to one advantageous design embodiment of the invention the first sliding bearing segment has a first pressure surface which faces the first compression chamber, and a second pressure surface which faces the second compression chamber, wherein the first pressure surface is smaller than the second pressure surface. On account of dimensioning the pressure surfaces in this manner it can be achieved in the case of identical pressure in the first compression chamber and the second compression chamber that the force acting on the second pressure surface is greater than the force acting on the first pressure surface. The sliding bearing segment is therefore pushed away in a self-acting manner from the bearing face of the second bearing ring, on account of which the pressure in the second compression chamber on account of outflowing lubricant decreases until an equilibrium of force between the two forces is reached. The sliding bearing segment in the state of equilibrium can assume a position at which an adequate lubricant gap is present between the sliding bearing segment and the bearing face. It can be prevented on account thereof that the sliding bearing segment undesirably comes to bear on the bearing face on the second bearing ring, so that a wear-free operation is enabled. A design embodiment of this type is advantageous for large bearing assemblies, in particular having a diameter in the range from 1 m to 10 m. By virtue of production deviations or stress-related deformations, the width of the lubricant gap in the case of large bearing assemblies often varies in the circumferential direction. The functional capability of bearing assemblies of this type can be guaranteed on account of the sliding bearing segment that in a self-acting manner moves to the state of equilibrium.

A plurality of second compression chambers can also be provided instead of a single second compression chamber. In the case of design embodiments of the invention that have a plurality of second compression chambers, the sum of the pressure surfaces of the plurality of second compression chambers is preferably larger than the first pressure surface.

The ratio of the first pressure surface to the second pressure surface, or to the sum of the plurality of second pressure surfaces, respectively, is less than 1 and is preferably in the range between 0.5 and 1, preferably in the range between 0.7 and 1.

The second pressure surface of the first sliding bearing segment is preferably delimited by a peripheral protrusion such that any lateral leakage of the lubricant from the second compression chamber is impeded. The peripheral protrusion can be disposed so as to completely encircle the pressure surface. The peripheral protrusion preferably has a curvature, the profile of the curvature being adapted to the curvature of the bearing face of the second bearing ring. The curvature of the peripheral protrusion and of the bearing face are particularly preferably identical such that the peripheral protrusion in the event of a stoppage of the bearing assembly bears on the bearing face.

According to one advantageous design embodiment of the invention a cross-sectional constriction, in particular a flow throttle, is disposed in the duct. The exchange of lubricant between the first compression chamber and the second compression chamber, that is to say between the front side and the rear side of the sliding bearing element, can be adjusted by way of the cross-sectional constriction. The cross-sectional constriction is preferably configured in such a manner that an adequately dimensioned lubricant gap is present between the sliding bearing segment and the bearing face of the second bearing ring. The cross-sectional constriction is preferably a capillary throttle or a annular gap throttle.

It is advantageous for a sealing element to be disposed between the first sliding bearing segment and the first bearing ring, in particular the receptacle pocket, such that any undesirable outflow of lubricant from the first compression chamber, that is to say from the rear side of the sliding bearing segment about the latter, can be prevented. It can be achieved on account of the sealing element that an exchange of lubricant can take place substantially, preferably exclusively, by way of the duct of the sliding bearing segment.

According to one advantageous design embodiment it is provided that the first sliding bearing segment is configured in such a manner that a plurality of second compression chambers, in particular three or four second compression chambers, are formed between the first sliding bearing segment and the second bearing ring, wherein the first compression chamber and the plurality of second compression chambers are connected by way of a plurality of ducts that run through the first sliding bearing segment. The sliding bearing segment on that side thereof that faces the bearing face of the second bearing ring can comprise a plurality of protrusions which form lateral delimitations for a plurality of, in particular three or four, second compression chambers. Any undesirable tilting of the sliding bearing segment in relation to the second bearing ring can be minimized on account of the plurality of second compression chambers that are formed between the first sliding bearing segment and the second bearing ring. This means that contact with the second bearing ring by a tilted sliding bearing segment can be prevented even in the event of a malfunction in the pressure supply, for example a loss of pressure.

In this context it is preferable for a cross-sectional constriction, in particular a flow throttle, to be disposed in each duct such that the exchange of lubricant between the first compression chamber and the other compression chambers, in particular a second, third, fourth, and fifth compression chamber, can be adjusted. The cross-sectional constrictions are preferably configured in such a manner that an adequately dimensioned lubricant gap is present between the sliding bearing segment and the bearing face of the second bearing ring. The cross-sectional constrictions can be of dissimilar configurations.

A further subject matter of the invention is a wind turbine having a rotor shaft, wherein the rotor shaft is mounted by way of a bearing assembly described above. The first bearing ring of the bearing assembly is preferably configured as a stationary bearing ring. For example, the first bearing ring can be connected to a support structure of the wind turbine, for example to a nacelle of a wind turbine. The second bearing ring is preferably connected in a rotationally fixed manner to the rotor shaft.

A further subject matter of the invention is a machine tool having a rotary table, wherein the rotary table is mounted by way of a bearing assembly described above. The first bearing ring of the bearing assembly is preferably configured as a stationary bearing ring. For example, the first bearing ring can be connected to a support structure of the machine tool. The second bearing ring is preferably connected in a rotationally fixed manner to the rotary table.

A further subject matter of the invention is a transmitting and/or receiving installation having a stationary base and an antenna that is rotatable in relation to the base, wherein the antenna is mounted on the base by way of a bearing assembly described above. The first bearing ring of the bearing assembly is preferably configured as a stationary bearing ring. For example, the first bearing ring can be connected to the base of the transmitting and/or receiving installation. The second bearing ring is preferably connected in a rotationally fixed manner to the antenna.

A wind turbine 1 which comprises a tower 5 and a nacelle 4 that is disposed so as to be rotatable in relation to the tower 5 is shown in FIG. 1. A rotor 3 is rotatably mounted on the nacelle 4 by a rotor shaft. The rotor shaft is mounted by way of a bearing assembly 10 according to the invention. A first bearing ring 11 of the bearing assembly 10 herein is configured as a stationary bearing ring. A second bearing ring 12, which is rotatable in relation to the first bearing ring 10 is connected in a rotationally fixed manner to the rotor shaft. A plurality of rotor blades 2 are provided on the rotor 3.

The bearing assembly 10 is configured as a large roller bearing having a diameter in the range from 1 m to 10 mm, preferably from 3 m to 7 m, particularly preferably from 4 m to 6 m, for example 2.5 m. Various exemplary embodiments of bearing assemblies 10 which connect the rotor 3 so as to be rotatable on the nacelle 4 are to be described hereunder.

FIGS. 2 to 5 show a first exemplary embodiment of a bearing assembly 10 according to the invention, having a first stationary bearing ring 11 which is configured as an inner ring. In order for the assembling of the bearing assembly 10 to be simplified, the first bearing ring is configured as a bearing ring that is split in the axial direction A and comprises a plurality of bearing parts 11.1, 11.2, 11.3. The bearing assembly 10 furthermore comprises a second bearing ring 12 which is configured as an outer ring and which in relation to the first bearing ring 11 is mounted so as to be rotatable about a rotation axis D. The second bearing ring 12 concentrically surrounds the first bearing ring 11. Two rows of rolling elements 13, 14, such as roller bearings, for example, are disposed between the bearing rings 11, 12. Each of the rows of rolling elements 13, 14 comprises a plurality of rolling elements 15, 16 which are disposed so as to be mutually spaced apart. The spacing between the rolling elements can be adjusted by spacers (not illustrated in the drawing) or a cage. The rolling elements 15, 16 of the rows of rolling elements 13, 14 are disposed in such a manner that the rolling elements 15, 16 are disposed so as to be capable of rolling on a first raceway 11.4, 11.5 of the first bearing ring 11 and on a second raceway 12.1, 12.2 of the second bearing ring 12. The rolling elements 15, 16 of the rows of rolling elements 13, 14 are tapered rollers. The rolling elements 15, 16 of the rows of rolling elements are of identical configuration. The rows of rolling elements 13, 14 are disposed in such a manner that the bearing assembly forms an axial/radial bearing which can receive forces in the axial direction A as well as in the radial direction R. According to the exemplary embodiment, the rotation axes of the rolling elements 15, 16 are disposed so as to be inclined in relation to the axial direction A as well as in relation to the radial direction.

The bearing assembly 10 is a hybrid bearing assembly which in addition to the rows of rolling elements 13, 14 comprises a plurality of rows of sliding bearing segments that are formed from sliding bearing segments 21, 22, 23, wherein the rolling elements 15, 16 as well as the sliding bearing segments interact with the second bearing ring 12. A first row of sliding bearing segments is formed from a plurality of first sliding bearing segments 21 which are disposed and hydrostatically supported on the first bearing ring 11 and which are mutually spaced apart in a circumferential direction of the first bearing ring 11. The first sliding bearing segments 21 interact with a first bearing face 12.3 that is disposed on the second bearing ring 12, wherein a lubricating gap which is filled with a lubricant, for example an oil, is configured between the first sliding bearing segments 21 and the first bearing face 12.3. The first bearing face 12.3 is designed so as to be cylindrical. The lubricant is actively fed by way of a lubricant supply system, for example an oil pump. The infeeding of the lubricant is performed by way of an infeed duct 17 in the first bearing ring 11, the infeed duct 17 opening out in a receptacle pocket 11.6 of the first bearing ring 1. The hydrostatic sliding bearing segments 21 transmit forces between the bearing rings 11, 12 even in the event of a stoppage or at low rotating speeds of the bearing rings 11, 12. Since a plurality of sliding bearing segments 21 are disposed so as to be disposed in a spaced apart manner along the circumferential direction, the lubricant gap can adjust itself individually on the sliding bearing elements such that a lubricant gap which is homogenized across the circumferential direction and which has a reduced lubricant throughput is obtained.

Figure 8:
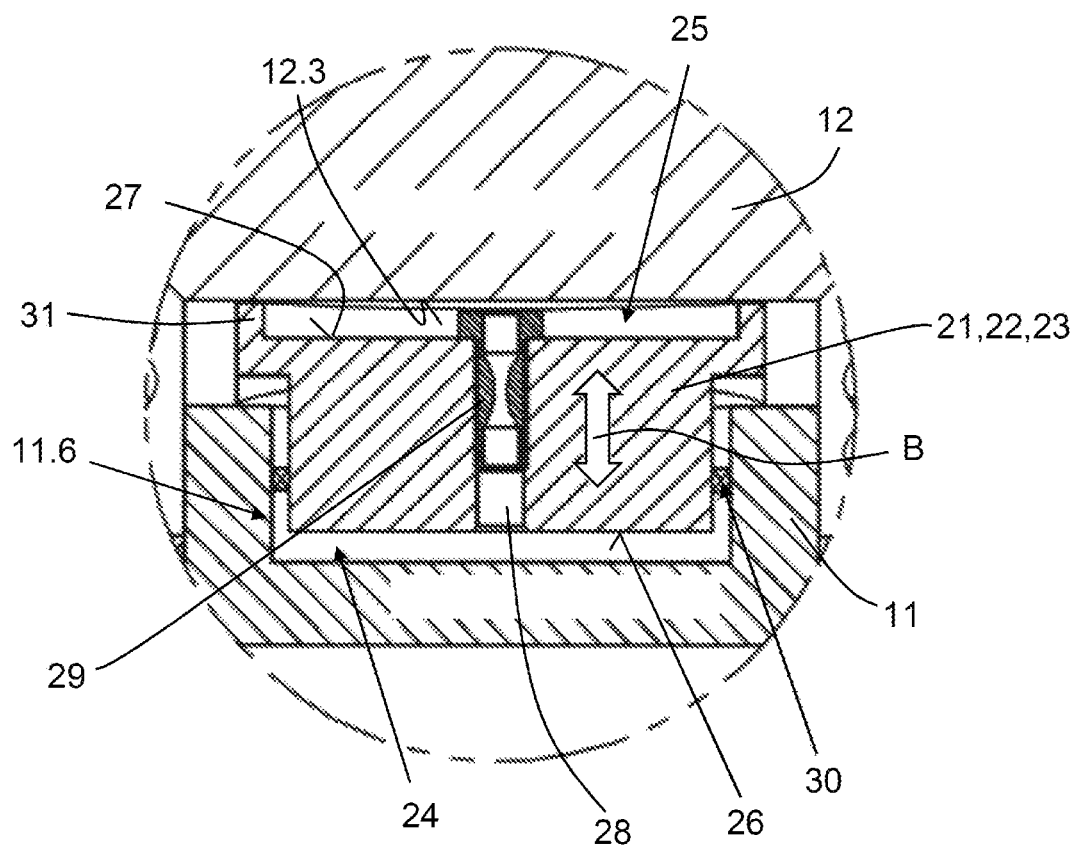
FIG. 8 is a sectional view of an example sliding bearing segment in a receptacle pocket.

A potential design embodiment of the first sliding bearing segment 21 is to be discussed hereunder by means of the sliding bearing segment 21, 22, 23 that is shown in an exemplary manner in FIG. 8. The first sliding bearing segments 21 are received in the receptacle pocket 11.6 of the first bearing ring 11 in such a manner that a first compression chamber 24 is formed between the first bearing ring 1 and the respective first sliding bearing segment 21. Furthermore, the first sliding bearing segment 21 is configured in such a manner that a second compression chamber 25 is formed between the first sliding bearing segment 21 and the second bearing ring 12. The second compression chamber is delimited by the second pressure surface 27 of the sliding bearing segment 21, a peripheral protrusion 31 that encircles the second pressure surface 27, as well as the bearing face 12.3 on the second bearing ring 12. The first compression chamber 24 and the second compression chamber 25 are connected by way of a duct 28 that runs through the first sliding bearing segment such that a lubricant exchange is possible between the front side and the rear side of the first sliding bearing segment 21. A sealing element 30 is disposed between the first sliding bearing segment 21 and the first bearing ring 11. The sealing element 30 bears on an internal contour of the receptacle pocket 11.6 and prevents any undesirable outflow of lubricant from the first compression chamber 24. To this extent, an exchange of lubricant between the first compression chamber 24 and the second compression chamber 25 is possible exclusively by way of the duct 28 of the first sliding bearing segment 21. A cross-sectional constriction 29 that is configured as a flow throttle is disposed in the duct 28.

The first sliding bearing segment 21 on the rear side thereof comprises a first pressure surface 26 which faces the first compression chamber 24. A second pressure surface 27 which faces the second compression chamber 25 is provided on the front side of the first sliding bearing segment. As can be seen by means of the illustration in FIGS. 9 and 10, the first pressure surface 26 is smaller than the second pressure surface 27. A pressure equalization between the first compression chamber 24 and the second compression chamber 25 can take place by way of the duct 28 such that a substantially identical pressure prevails in the first compression chamber 24 and the second compression chamber 25. It now is achieved on account of the dimensioning of the pressure surfaces 26, 27 that the force acting on the second pressure surface 27 is greater than the force which acts on the first pressure surface 26. The sliding bearing segment 21 is therefore pushed away in a self-acting manner from the bearing face 12.3 of the second bearing ring 12, on account of which the pressure in the second compression chamber 25 on account of outflowing lubricant decreases until an equilibrium of force between the two forces is reached. To this extent, the sliding bearing segment is moved in a movement direction B which is aligned so as to be perpendicular to the bearing face 12.3. The sliding bearing segment 21 in the state of equilibrium can assume a position at which an adequate lubricant gap is present between the sliding bearing segment and the bearing face. It is prevented on account thereof that the sliding bearing segment 21 undesirably comes to bear on the bearing face 12.3 on the second bearing ring 12, so that a wear-free operation is enabled. The position of the sliding bearing segment 21 in the state of equilibrium and/or the width of the lubricant gap can be influenced by the adjustment of the lubricant flow through the infeed 17, the selection of a suitable cross-sectional constriction 29, as well as the mutual ratio of the pressure surfaces 26, 27.

Figure 11:
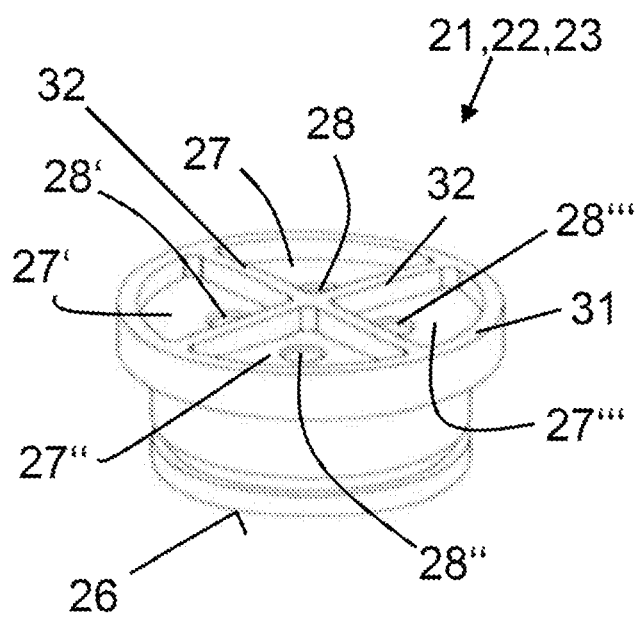
FIG. 11 is a perspective view of another example sliding bearing segment.

A plurality of second compression chambers can also be provided instead of a single second compression chamber 25 (cf. FIG. 11). In the case of design embodiments of the invention that have a plurality of second compression chambers, the sum of the pressure surfaces of the plurality of second compression chambers is preferably larger than the first pressure surface 26.

The ratio of the first pressure surface 26 to the second pressure surface 27, or to the sum of the plurality of second pressure surfaces, respectively, is less than 1 and is preferably in the range between 0.5 and 1, preferably in the range between 0.7 and 1.

Figure 9:
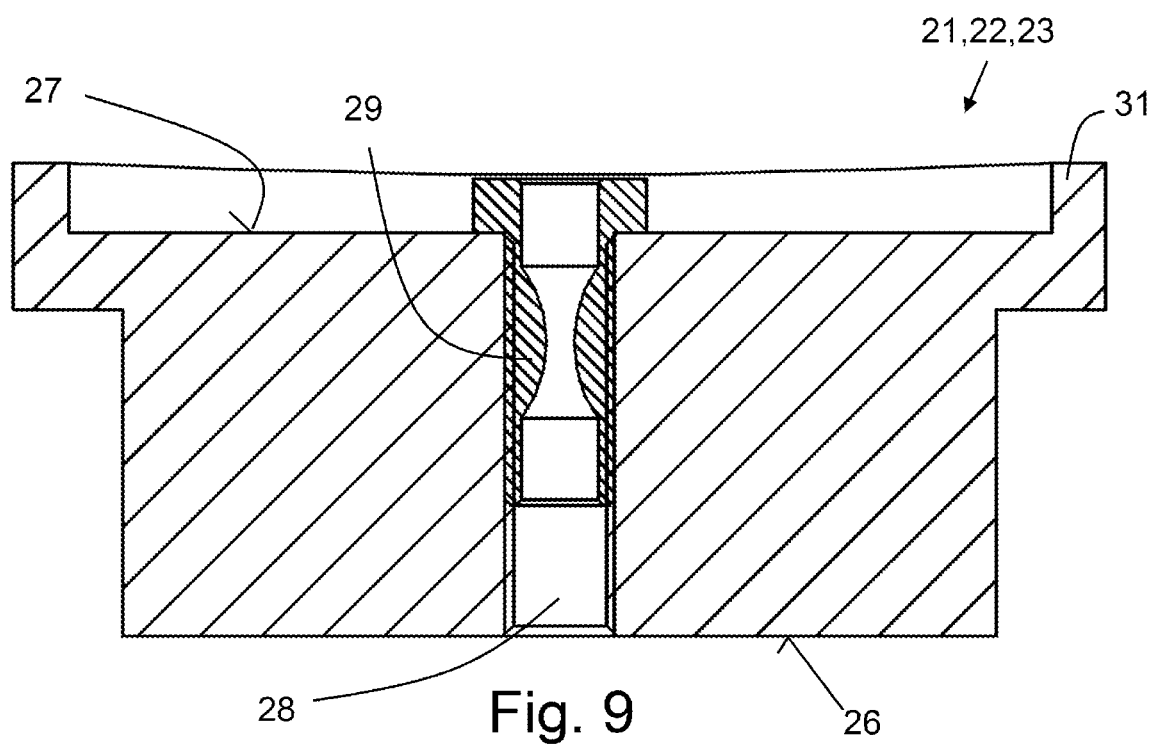
FIG. 9 is a sectional view of the sliding bearing segment of FIG. 8.
Figure 10:
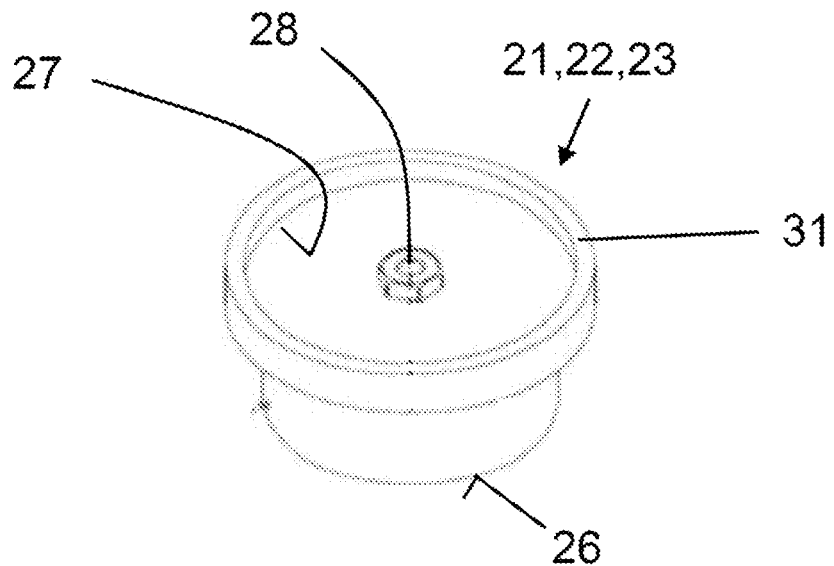
FIG. 10 is a perspective view of the sliding bearing segment of FIG. 8.

The sliding bearing segment 21 shown in FIGS. 8, 9, and 10 has a circular cross section, that is to say that the first pressure surface 26 and the second pressure surface 27 are circular. Deviating from this design embodiment, the sliding bearing segment 21 can have another cross section, for example a triangular, quadrangular, or polygonal cross section.

Figure 2:
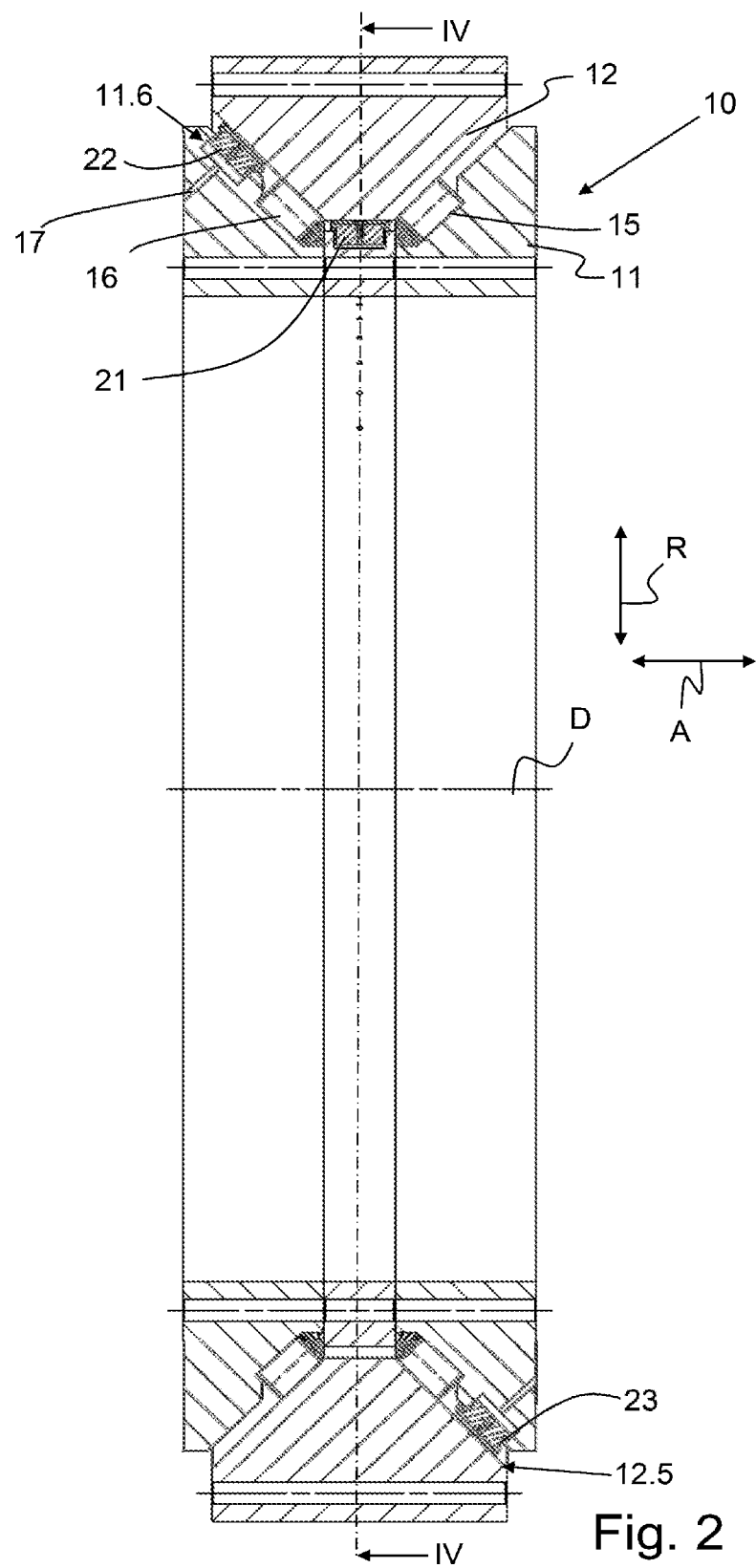
FIG. 2 is a sectional view of an example bearing assembly along an axial plane that includes a rotation axis.
Figure 3:
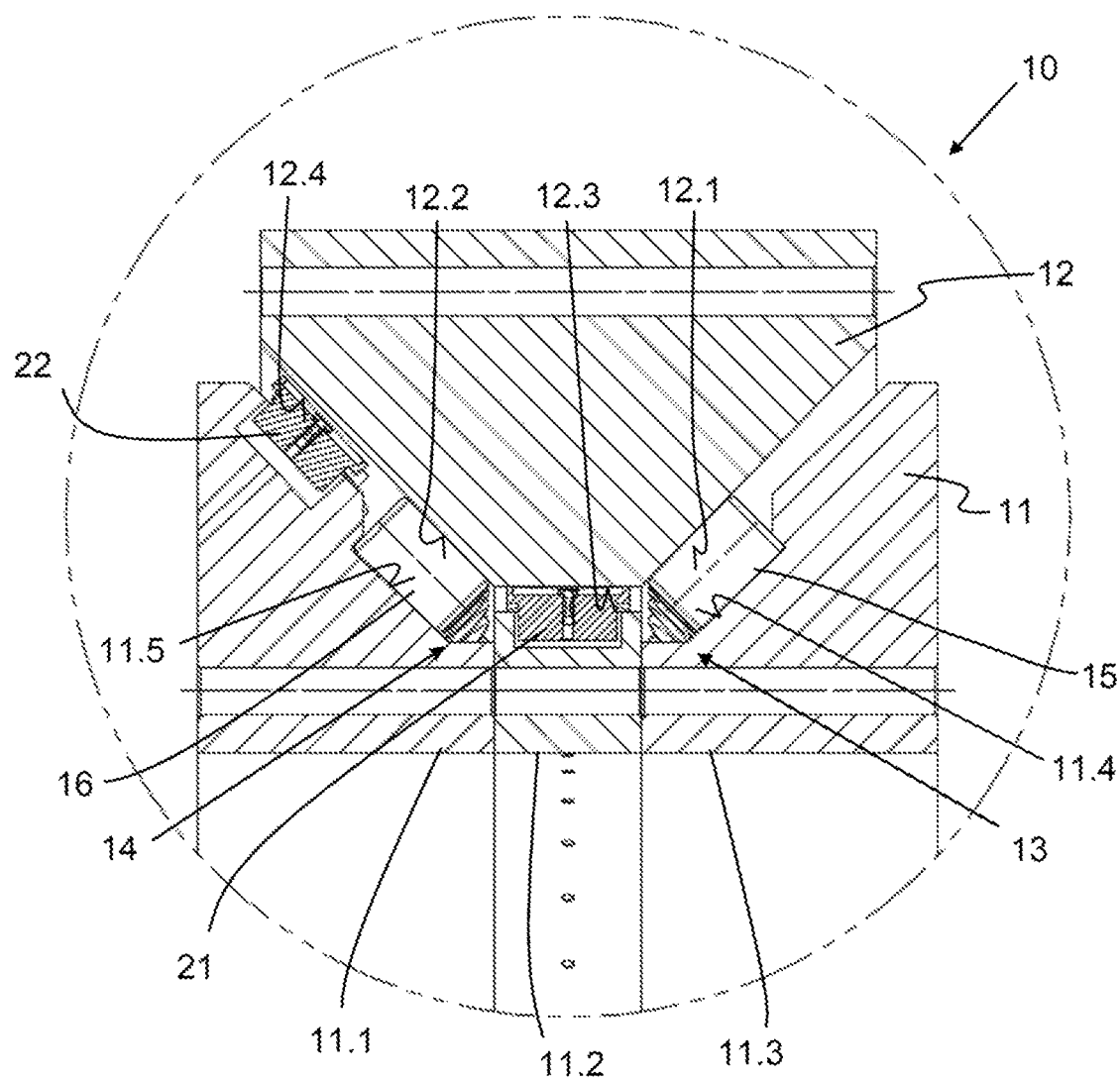
FIG. 3 is a detail view of the example bearing assembly from FIG. 2.

As can be furthermore derived from the illustration in FIGS. 2 and 3, the raceways 12.1, 12.2 of the rows of rolling elements 13, 14 are disposed at an angle in relation to a radial plane, the angle being in the range between 0° and 90°, preferably between 30° and 60°, particularly preferably between 40° and 50°, for example 45°. The first bearing face 12.3 is aligned so as to be parallel to the rotation axis D such that forces that act substantially in the radial direction R can be transmitted by way of the first hydrostatic sliding bearing segments 21.

Furthermore, a plurality of hydrostatically supported second sliding bearing segments 22 of a second row of sliding bearing segments as well as a plurality of hydrostatically supported third sliding bearing segments 23 of a third row of sliding bearing segments are disposed on the first bearing ring 11. The first row of rolling elements 15 is disposed between the first and the third row of sliding bearing segments, and the second row of rolling elements is disposed between the first and the second row of sliding bearing segments. The second sliding bearing segments 22 and the third sliding bearing segments 23 are preferably configured so as to be identical to the first sliding bearing segments 21 such that the explanations pertaining to FIGS. 8 to 10 also apply to the sliding bearing segments. Alternatively, the sliding bearing segments 21, 22, 23 of the individual rows of sliding bearing segments can be dissimilarly configured. The second sliding bearing segments 22 interact with a second bearing face 12.4 which is provided on the second bearing ring 12. The third sliding bearing segments 23 interact with a third bearing face 12.5 of the second bearing ring 12. The second bearing face 12.4 and the third bearing face 12.5 in relation to a radial plane are disposed at an angle which is identical to the angle which the raceways 12.1, 12.2 enclose in relation to the radial plane. This angle is in the range between 0° and 90°, preferably between 30° and 60°, particularly preferably between 40° and 50°, for example 45°. To this extent, the second bearing ring 12 has a substantially V-shaped or trapezoidal cross section.

In the case of the first exemplary embodiment, the first sliding bearing segments 21 are mounted so as to be movable in the axial direction R such that the lubricant gap between the sliding bearing segment 21 and the bearing face 12.3 can be adjusted by a movement of the sliding bearing segment 21 along the movement direction. The movement direction is oriented so as to be perpendicular to the first bearing face 12.3. The second sliding bearing segments 22 and the third sliding bearing segments 23 are in each case likewise mounted so as to be movable in a movement direction that is aligned so as to be perpendicular to the respective bearing face 12.4, 12.5. The mounting of the sliding bearing segments 21, 22, 23 furthermore enables some tilting of the sliding bearing segments 21, 22, 23 about a tilting axis which is aligned so as to be perpendicular to the respective movement direction.

Figure 4:
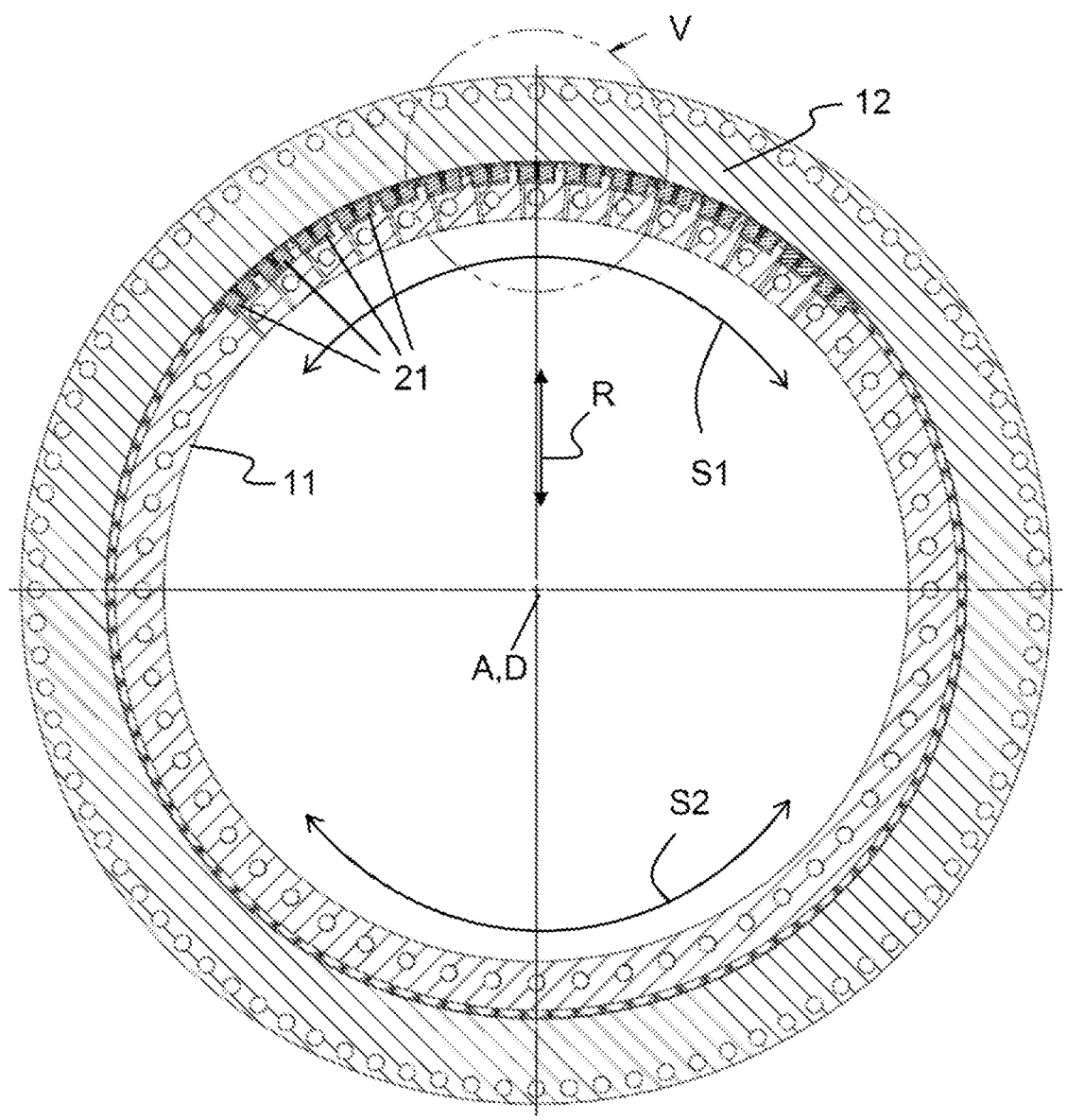
FIG. 4 is a sectional view along a radial plane IV-IV of the example bearing assembly in FIG. 2.
Figure 5:
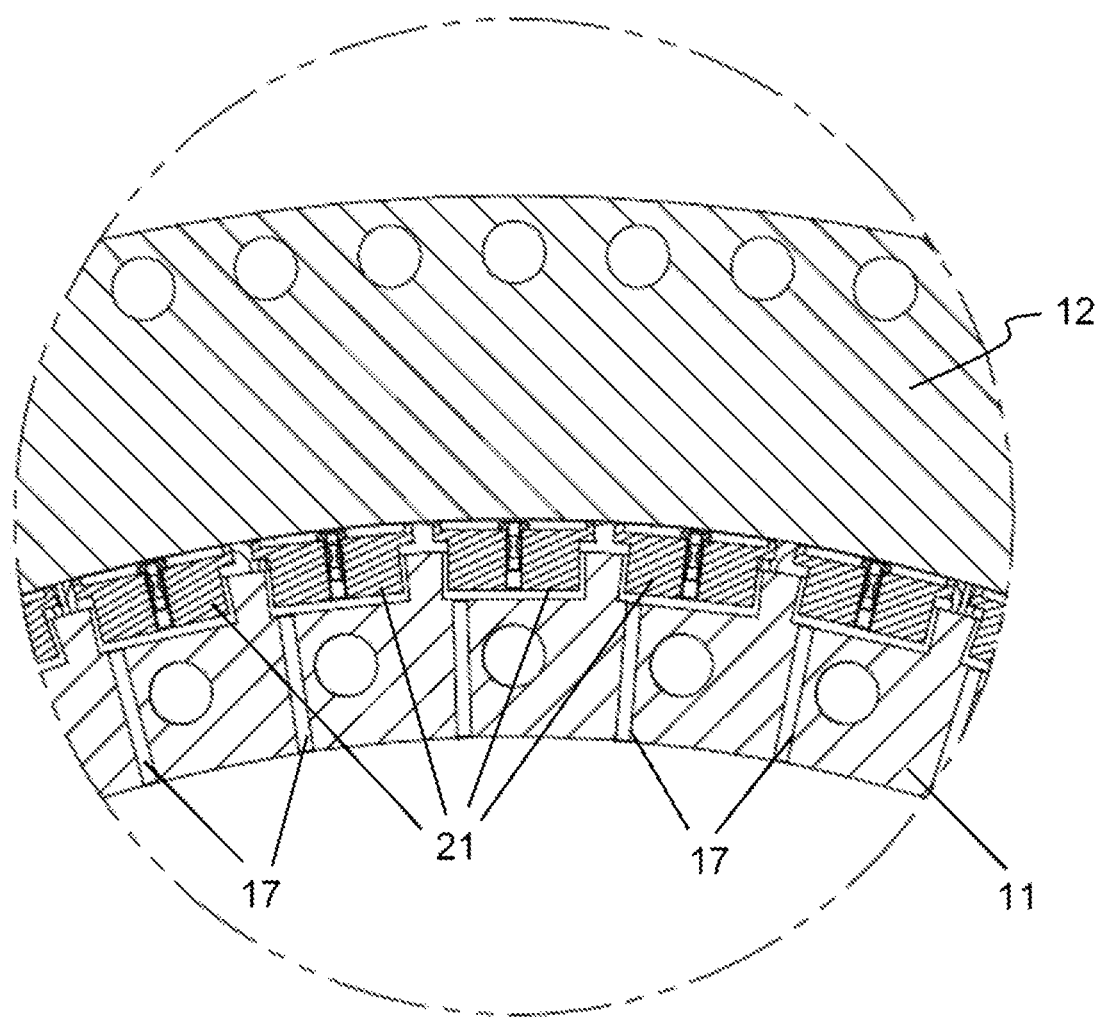
FIG. 5 is a detail view of the detail V identified in FIG. 4.

As is shown in the illustrations in FIGS. 4 and 5, the first sliding bearing segments 21 along the circumferential direction of the first bearing ring 11 are disposed so as to be distributed in a substantially non-uniform manner across the entire first bearing ring 11. The first bearing ring 11 along the circumferential direction has a first annular-segment-shaped region S1 having a plurality of sliding bearing segments 21, the region S1 being shown at the top in FIG. 4. Furthermore provided is a second annular-segment-shaped region S2 in which no sliding bearing segments are disposed. The first annular-segment-shaped region S1 having a plurality of first sliding bearing segments 21 is preferably disposed in a portion of the first bearing ring 11 in which there is an increased effect of force, for example effect of weight.

The illustration in FIG. 2 highlights that the first sliding bearing segments 22 and the third sliding bearing segments 23 are disposed so as to be asymmetrical in terms of a radial plane that is disposed so as to be perpendicular to a rotation axis of the bearing assembly. In the case of a stationary disposal of the first bearing ring 11, a design embodiment of this type enables a further adaptation to non-symmetrical effects of forces to be anticipated. The second and the third rows of sliding bearing segments comprise in each case a first annular-segment-shaped region in which a plurality of sliding bearing segments 22, 23 are disposed, and a second annular-segment-shaped region in which no sliding bearing segments are disposed. In the illustration of FIG. 2, the first annular-segment-shaped region of the second row of sliding bearing segments is disposed at the top, and the first annular-segment-shaped region of the third row of sliding bearing segments is disposed at the bottom.

The first sliding bearing segments 21 of the first row of sliding bearing segments along the circumferential direction are disposed so as to be distributed uniformly across the entire first bearing ring. The first row of sliding bearing segments in the circumferential direction thus extends around the entire first bearing ring 11. The first sliding bearing segments 21 are in each case disposed at an identical mutual spacing.

Figure 6:
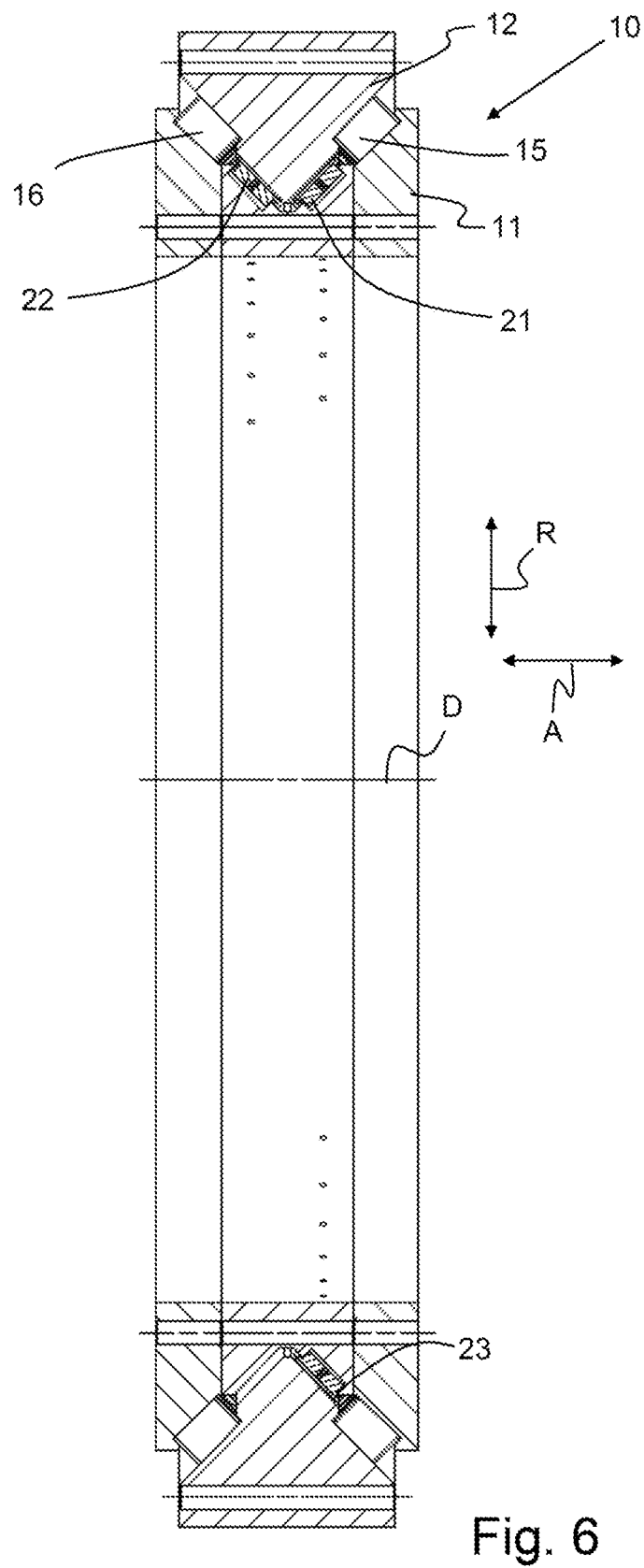
FIG. 6 is a sectional view of another example bearing assembly along an axial plane that includes a rotation axis.
Figure 7:
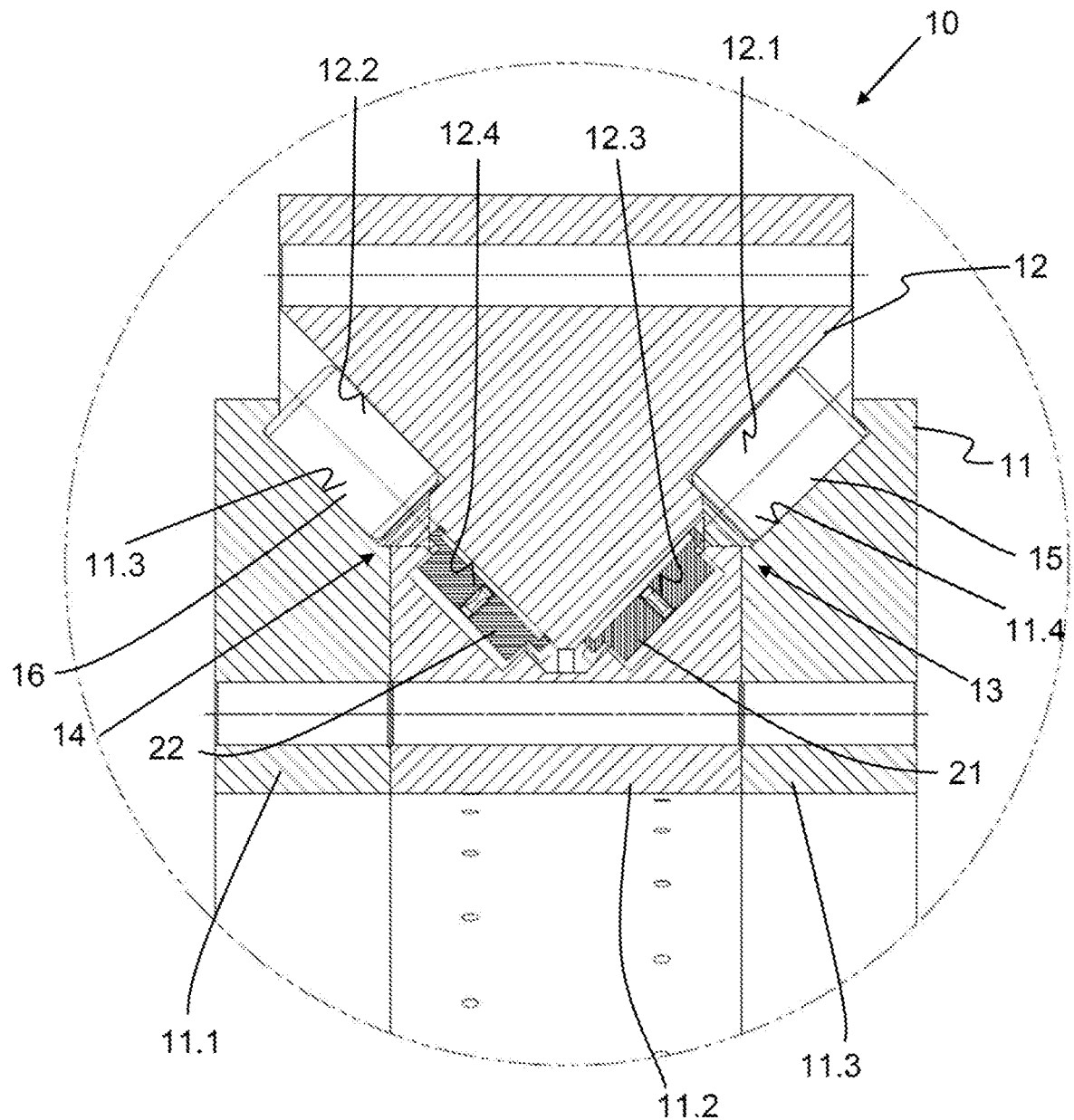
FIG. 7 is a detail view of the example bearing assembly from FIG. 6.

FIGS. 6 and 7 show a second exemplary embodiment of a bearing assembly 10 according to the invention. By contrast to the first exemplary embodiment, the bearing assembly 10 according to the second exemplary embodiment comprises two rows of roller bearings and two rows of sliding bearing segments. Both the first row of sliding bearing segments having the first sliding bearing segments 21 and the second row of sliding bearing segments having the first sliding bearing segments 22 are disposed between the rows of rolling elements 13, 14. The first sliding bearing segments 21 interact with a first bearing face 12.3 of the second bearing ring 12, and the second sliding bearing segments 22 interact with a second bearing face 12.4. The first bearing face 12.3 in relation to a radial plane is disposed at an angle which is identical to the angle which the first raceway 12.1 encloses in relation to the radial plane. The second bearing face 12.4 in relation to a radial plane is disposed at an angle which is identical to the angle which the second raceway 12.2 encloses in relation to the radial plane. The value of this angle is in the range between 0° and 90°, preferably between 30° and 60°, particularly preferably between 40° and 50°, for example is 45°. To this extent, the second bearing ring 12 has a substantially V-shaped or trapezoidal cross section.

It can be derived from the illustration in FIG. 6 that the first sliding bearing segments 21 of the first row of sliding bearing segments along the circumferential direction are disposed so as to be distributed uniformly across the entire first bearing ring. The first row of sliding bearing segments in the circumferential direction thus extends around the entire first bearing ring 11. The first sliding bearing segments 21 are in each case disposed at an identical mutual spacing. The first sliding bearing segments 21 and the second sliding bearing segments 22 are disposed so as to be asymmetrical in terms of a radial plane that is disposed so as to be perpendicular to a rotation axis of the bearing assembly. The second row of sliding bearing segments comprises a first annular-segment-shaped region in which a plurality of sliding bearing segments 22 are disposed, and a second annular-segment-shaped region in which no sliding bearing segments disposed. In the illustration of FIG. 6, the first annular-segment-shaped region of the second row of sliding bearing segments is disposed at the top, and the second annular-segment-shaped region is disposed at the bottom.

FIG. 11 shows a sliding bearing segment 21, 22, 23 according to a second exemplary embodiment in a perspective illustration. As opposed to the sliding bearing segment 21, 22, 23 shown in FIGS. 8, 9, and 10, this sliding bearing segment 21, 22, 23 is configured in such a manner that a plurality of, in particular four, compression chambers are formed between the sliding bearing segment 21, 22, 23 and the second bearing ring 11. Toward the bottom, the individual compression chambers are delimited by four pressure surfaces 27, 27', 27", 27''', and laterally by the peripheral protrusion 31 as well as further protrusions 32. The pressure surfaces 27, 27', 27", 27''' are configured in the shape of sectors of a circle. The protrusions 32 divide the upper side of the sliding bearing segment 21, 22, 23 into a plurality of, in particular four, sectors of a circle.

On the lower side of the sliding bearing segment 21, 22, 23, the individual compression chambers are connected to the first compression chamber 24 by way of a plurality of ducts 28, 28', 28", 28''' that run through the sliding bearing segment 21, 22, 23. To this extent, each compression chamber on the upper side of the sliding bearing element is connected to the first compression chamber 24 by way of exactly one duct 28, 28', 28", 28'''. One cross-sectional reduction, in particular a flow throttle, can in each case be disposed within the ducts 28, 28', 28", 28'''.

The sliding bearing segment 21, 22, 23 shown in FIG. 11 can be used in the bearing assemblies 10 described above and, in comparison to the sliding bearing segment 21, 22, 23 shown in FIGS. 8, 9, and 10, offers the advantage that the inclination of the sliding bearing segment 21, 22, 23 toward tilting in relation to the respective bearing face 12.3, 12.4, 12.5 can be reduced.

The sum of the second pressure surfaces 27, 27', 27", 27''' is larger than the first pressure surface 26. On account of dimensioning the pressure surfaces in this manner it can be achieved in the case of identical pressure in the first compression chamber and the second compression chamber that the resulting force acting on the second pressure surfaces 27, 27', 27", 27''' is greater than the force acting on the first pressure surface 26. The sliding bearing segment is therefore pushed away in a self-acting manner from the bearing face of the second bearing ring, on account of which the pressure in the second compression chamber on account of outflowing lubricant decreases until an equilibrium of force between the two forces is reached. The sliding bearing segment in the state of equilibrium can assume a position at which an adequate lubricant gap is present between the sliding bearing segment and the bearing face. It can be prevented on account thereof that the sliding bearing segment undesirably comes to bear on the bearing face on the second bearing ring, so that a wear-free operation is enabled.

The bearing assemblies 10 described above have in each case a first bearing ring 11, a second bearing ring 12, and at least one row of rolling elements 13, 14 having a plurality of rolling elements 15, 16 which are disposed so as to be capable of rolling on a first raceway 11.4, 11.5 of the first bearing ring 11 and on a second raceway 12.1, 12.2 of the second bearing ring 12. At least one hydrostatically supported first sliding bearing segment 21, 22, 23 which interacts with a first bearing face 12.3, 12.4, 12.5 that is disposed on the second bearing ring 12 is disposed on the first bearing ring 11.

In the description above, the use of a definite or indefinite article in conjunction with a noun is also intended to include the plural of the noun, in so far as no mention is made to the contrary. The terms "first", "second", "third", and "fourth" in the description and the claims are intended to enable the differentiation between similar elements and do not describe any specific sequence of the elements. The wording of the "first sliding bearing segments", "second sliding bearing segments", and "third sliding bearing segments" serves in particular only for assigning the sliding bearing segments so as to form a row of sliding bearing segments. The advantageous design embodiments and features described in the context of one row of sliding bearing segments can also be used in the case of the sliding bearing segments of the other rows.

LIST OF REFERENCE SIGNS

1 Wind turbine
2 Rotor blade
3 Rotor
4 Nacelle
5 Tower
10 Bearing assembly
11 Bearing ring
11.1, 11.2, 11.3 Bearing ring part
11.4, 11.5 Raceway
11.6 Receptacle pocket
12 Bearing ring
12.1, 12.2 Raceway
12.3, 12.4, 12.5 Bearing face
13 Row of rolling elements
14 Row of rolling elements
15 Rolling element
16 Rolling element
17 Infeed
21 Sliding bearing segment
22 Sliding bearing segment
23 Sliding bearing segment
24 Compression chamber
25 Compression chamber
26 Pressure surface
27 Pressure surface
27', 27", 27''' Pressure surface
28 Duct 28', 28'', 28''' Duct
29 Cross-sectional constriction
30 Sealing element
31 Peripheral protrusion
32 Protrusion
A Axial direction
B Movement direction
D Rotation axis
R Radial direction

What is claimed is:

1. A bearing assembly comprising:
a first bearing ring;
a second bearing ring;
a row of rolling elements, wherein a plurality of the rolling elements are disposed so as to be rollable on a first raceway of the first bearing ring and on a second raceway of the second bearing ring; and
a hydrostatically supported first sliding bearing segment disposed on the first bearing ring, wherein the hydrostatically supported first sliding bearing segment is configured to interact with a first bearing face disposed on the second bearing ring, wherein the hydrostatically supported first sliding bearing segment is mounted so as to be movable in a movement direction and tiltable about a tilting axis that is perpendicular to the movement direction.

2. The bearing assembly of claim 1 comprising a hydrostatically supported second sliding bearing segment disposed on the first bearing ring, wherein the hydrostatically supported second sliding bearing segment is configured to interact with a second bearing face disposed on the second bearing ring.

3. The bearing assembly of claim 2 comprising a plurality of the hydrostatically supported second sliding bearing segments disposed on the first bearing ring, wherein the plurality of the hydrostatically supported second sliding bearing segments are mutually spaced apart in a circumferential direction of the first bearing ring and interact with the second bearing face on the second bearing ring.

4. The bearing assembly of claim 3 comprising a plurality of the hydrostatically supported first sliding bearing segments disposed on the first bearing ring, wherein the plurality of the hydrostatically supported first sliding bearing segments are mutually spaced apart in the circumferential direction of the first bearing ring and interact with the first bearing face on the second bearing ring, wherein the plurality of hydrostatically supported first and second sliding bearing segments are disposed asymmetrically with respect to a radial plane that is perpendicular to a rotation axis of the bearing assembly.

5. The bearing assembly of claim 1 wherein the first bearing ring is configured as a stationary bearing ring and the second bearing ring is rotatable relative to the first bearing ring.

6. The bearing assembly of claim 1 wherein the rolling elements are tapered rollers.

7. A bearing assembly comprising:
a first bearing ring;
a second bearing ring;
a row of rolling elements, wherein a plurality of the rolling elements are disposed so as to be rollable on a first raceway of the first bearing ring and on a second raceway of the second bearing ring;
a hydrostatically supported first sliding bearing segment disposed on the first bearing ring, wherein the hydrostatically supported first sliding bearing segment is configured to interact with a first bearing face disposed on the second bearing ring; and
a plurality of the hydrostatically supported first sliding bearing segments disposed on the first bearing ring, wherein the plurality of the hydrostatically supported first sliding bearing segments are mutually spaced apart in a circumferential direction of the first bearing ring and interact with the first bearing face on the second bearing ring.

8. The bearing assembly of claim 7 wherein the plurality of the hydrostatically supported first sliding bearing segments are distributed uniformly across an entirety of the first bearing ring along the circumferential direction.

9. The bearing assembly of claim 7 wherein the plurality of the hydrostatically supported first sliding bearing segments are distributed non-uniformly across an entirety of the first bearing ring along the circumferential direction.

10. A bearing assembly comprising:
a first bearing ring;
a second bearing ring;
a row of rolling elements, wherein a plurality of the rolling elements are disposed so as to be rollable on a first raceway of the first bearing ring and on a second raceway of the second bearing ring;
a hydrostatically supported first sliding bearing segment disposed on the first bearing ring, wherein the hydrostatically supported first sliding bearing segment is configured to interact with a first bearing face disposed on the second bearing ring; and
a first sliding bearing element that is received in a receptacle pocket of the first bearing ring such that a first compression chamber is formed between the first bearing ring and the first sliding bearing element, wherein the first sliding bearing element is configured such that a second compression chamber is formed between the first sliding bearing element and the second bearing ring, wherein the first and second compression chambers are connected via a duct that extends through the first sliding bearing element.

11. The bearing assembly of claim 10 wherein the first sliding bearing element includes a first pressure surface that faces the first compression chamber and a second pressure surface that faces the second compression chamber, wherein the first pressure surface is smaller than the second pressure surface.

12. The bearing assembly of claim 11 wherein the second pressure surface of the first sliding bearing element is delimited by a peripheral protrusion.

13. The bearing assembly of claim 10 wherein a cross-sectional constriction is disposed in the duct.

14. The bearing assembly of claim 10 wherein the first sliding bearing element is configured such that a plurality of the second compression chambers are formed between the first sliding bearing element and the second bearing ring, wherein the first compression chamber and the plurality of the second compression chambers are connected by ducts that extend through the first sliding bearing element.

15. The bearing assembly of claim 10 wherein the first sliding bearing element includes a first pressure surface that faces the first compression chamber and a plurality of second pressure surfaces that face the second compression chamber, wherein the first pressure surface is smaller than a sum of the plurality of second pressure surfaces.

16. A bearing assembly comprising:
a first bearing ring;
a second bearing ring;
a row of rolling elements, wherein a plurality of the rolling elements are disposed so as to be rollable on a first raceway of the first bearing ring and on a second raceway of the second bearing ring; and
a hydrostatically supported first sliding bearing segment disposed on the first bearing ring, wherein the hydrostatically supported first sliding bearing segment is configured to interact with a first bearing face disposed on the second bearing ring, wherein the hydrostatically supported first sliding bearing segment is mounted so as to be movable in a movement direction that is perpendicular to the first bearing face.

* * * * *